(12) United States Patent
Kurtz

(10) Patent No.: US 10,138,833 B1
(45) Date of Patent: Nov. 27, 2018

(54) DIESEL ENGINE COLD STARTING SYSTEM AND METHODS

(71) Applicant: Ford Global Technologies, LLC, Dearborn, MI (US)

(72) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/696,550

(22) Filed: Sep. 6, 2017

(51) Int. Cl.
| F02D 41/06 | (2006.01) |
| F02D 41/00 | (2006.01) |
| F02D 41/26 | (2006.01) |
| F02D 41/30 | (2006.01) |
| F02B 37/24 | (2006.01) |
| F01B 7/02 | (2006.01) |
| F02B 75/28 | (2006.01) |
| F02B 7/02 | (2006.01) |

(52) U.S. Cl.
CPC .............. *F02D 41/064* (2013.01); *F01B 7/02* (2013.01); *F02B 37/24* (2013.01); *F02B 75/28* (2013.01); *F02D 41/0002* (2013.01); *F02D 41/0007* (2013.01); *F02D 41/0077* (2013.01); *F02D 41/26* (2013.01); *F02D 41/3005* (2013.01); *F02D 2200/021* (2013.01)

(58) Field of Classification Search
CPC ............... F02D 41/064; F02D 41/0007; F02D 41/0002; F02D 2200/021; F02B 37/24; F02B 75/28; F01B 7/02

USPC .......... 701/104, 113; 123/51 BA, 559.1, 565, 123/362, 453
See application file for complete search history.

(56) References Cited

U.S. PATENT DOCUMENTS

| 3,257,797 A * | 6/1966 | Lieberherr .......... F02B 29/0412 123/445 |
| 8,011,185 B2 | 9/2011 | Inoue et al. |
| 8,813,492 B2 * | 8/2014 | Hansen ................ F01C 11/008 123/559.1 |
| 2006/0180130 A1 * | 8/2006 | St. James ............... F02B 33/40 123/559.1 |
| 2011/0204654 A1 * | 8/2011 | Hansen .................. F02B 33/38 290/1 R |
| 2015/0033736 A1 * | 2/2015 | Kalebjian ........... F02B 29/0412 60/605.2 |
| 2015/0128907 A1 * | 5/2015 | Redon .................... F02B 75/12 123/46 R |
| 2015/0285161 A1 | 10/2015 | Ulrey et al. |

* cited by examiner

*Primary Examiner* — Mahmoud Gimie
(74) *Attorney, Agent, or Firm* — Julia Voutyras; McCoy Russell LLP

(57) ABSTRACT

Methods and systems for supplying starting a diesel engine that does not include glow plugs are described. In one example, a flow through a cylinder is limited during engine cranking to heat charge in a cylinder. In another example, a compressor is activated and air supplied to engine cylinders is heated via the engine and the compressor and recirculated to improve engine starting.

18 Claims, 5 Drawing Sheets

DIESEL ENGINE COLD STARTING SYSTEM AND METHODS

BACKGROUND/SUMMARY

A diesel engine may include glow plugs to heat air-fuel mixtures within the diesel engine so that engine starting during cold conditions may be improved. A glow plug in an engine cylinder may raise temperature within the engine cylinder so that an air-fuel mixture within the cylinder may ignite under increasing cylinder pressure as a piston in the cylinder approaches top dead center compression stroke. The glow plugs may be deactivated when the engine is warm and being restarted since the engine tends to heat the air-fuel mixture. Thus, it may be desirable to include glow plugs (e.g., electric heaters) in a diesel engine. However, it may not be possible to install glow plugs in some diesel engines because of the engine's configuration and because glow plugs typically protrude into engine cylinder. Therefore, it would be desirable to provide a way of cold starting a diesel engine without having to rely on glow plugs.

The inventor herein has recognized the above-mentioned disadvantages and has developed a diesel engine starting method, comprising: responsive to an engine start request, adjusting a supercharger having multiple drive ratios to a highest drive ratio, cranking an engine, and injecting fuel to the engine during cranking, where injecting fuel during engine cranking includes injecting an amount of fuel into engine cylinders during an engine cycle that provides for less than ten percent of energy in the injected fuel being released during the engine cycle.

By adjusting a supercharger drive ratio and injecting a small amount of fuel to engine cylinders during engine cranking in response to an engine start request; it may be possible to reliably cold start a diesel engine that does not include glow plugs. In particular, increasing the supercharger drive ratio may increase an amount of work performed on air entering engine cylinders, thereby increasing temperature in engine cylinders. Further, temperature within engine cylinders may be increased via low temperature heat released from the small amounts of fuel being injected. Instead of injecting larger amounts of cold fuel into engine cylinders and significantly chilling the air and fuel mixture in the engine cylinders, a small amount of fuel may be injected into a cylinder and that small amount of fuel may release heat into the cylinder when it is compressed without the small amount of fuel completely combusting. The heat added to the cylinder may be sufficient to facilitate combustion of a larger amount of fuel subsequently injected to the cylinder. Combustion of the larger amount of fuel may accelerate the engine crankshaft, thereby starting the engine. When less than ten percent of fuel injected combusts, a higher percentage of fuel injected participates in a first phase of two phase diesel fuel combustion than participates in the second phase of two phase diesel combustion so that cylinder heating may be improved.

The present description may provide several advantages. Specifically, the approach may allow for a diesel engine to be started without glow plugs during cold conditions. Further, in at least one example, charge in a cylinder may be heated without releasing significant exhaust emissions. In addition, the approach may apply different engine starting procedures for different low engine temperature engine starting conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
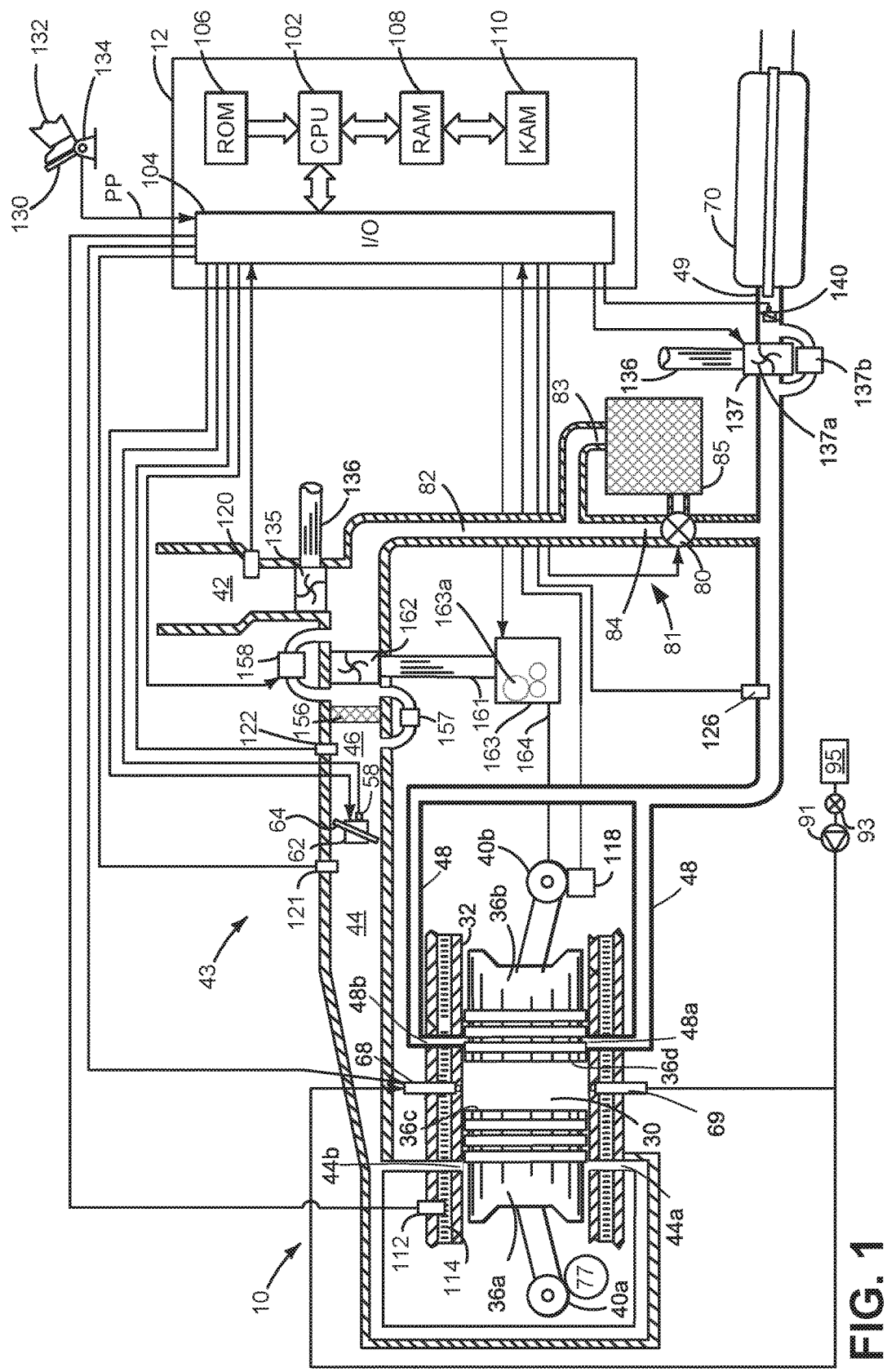
FIG. 1 shows a schematic depiction of an engine.
Figure 2:
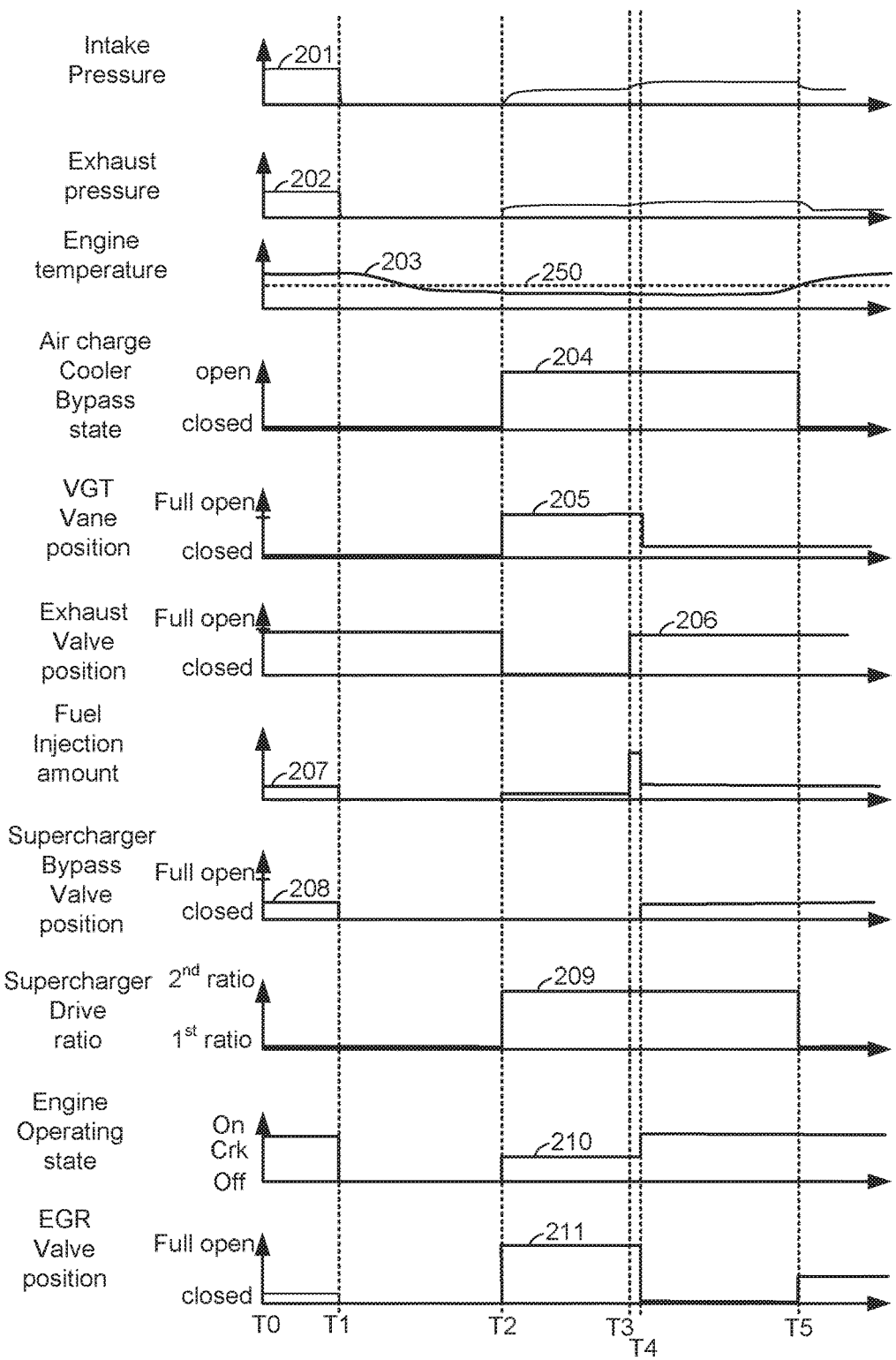
FIGS. 2 and 3 show example prophetic engine starting sequences for the engine shown in FIG. 1.
Figure 3:
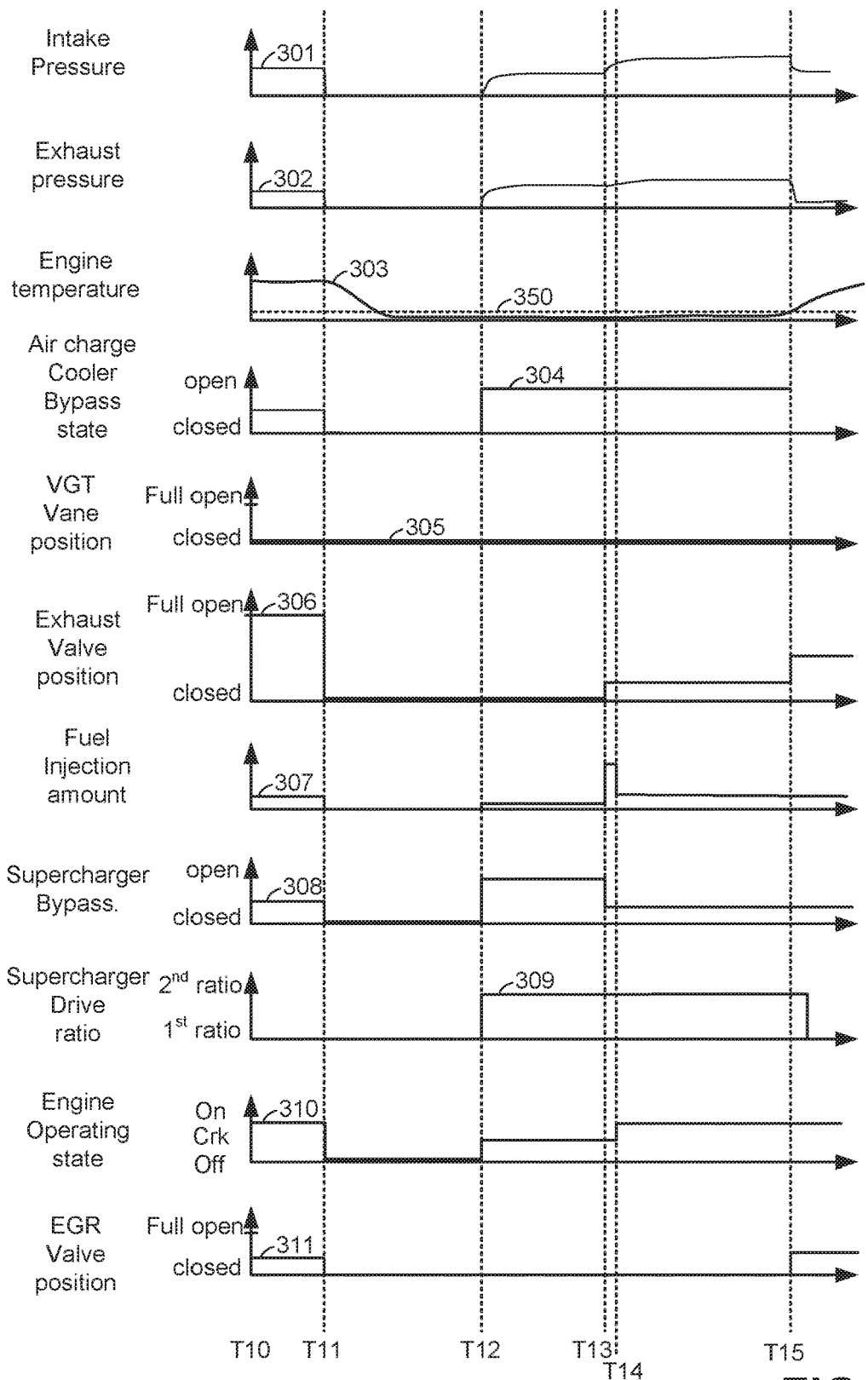
Figure 4A:
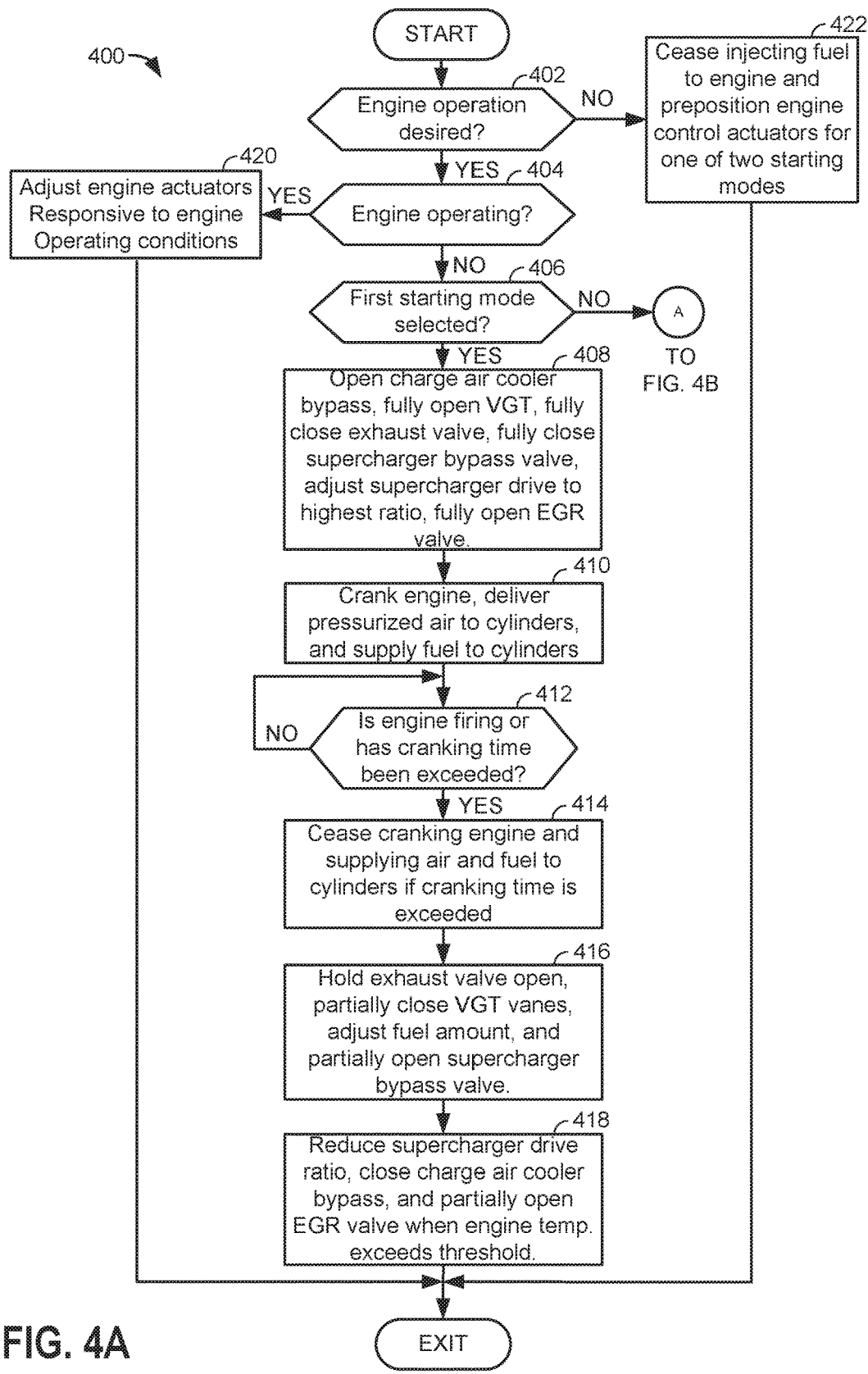
FIGS. 4A and 4B show an example method for starting the engine of FIG. 1.
Figure 4B:
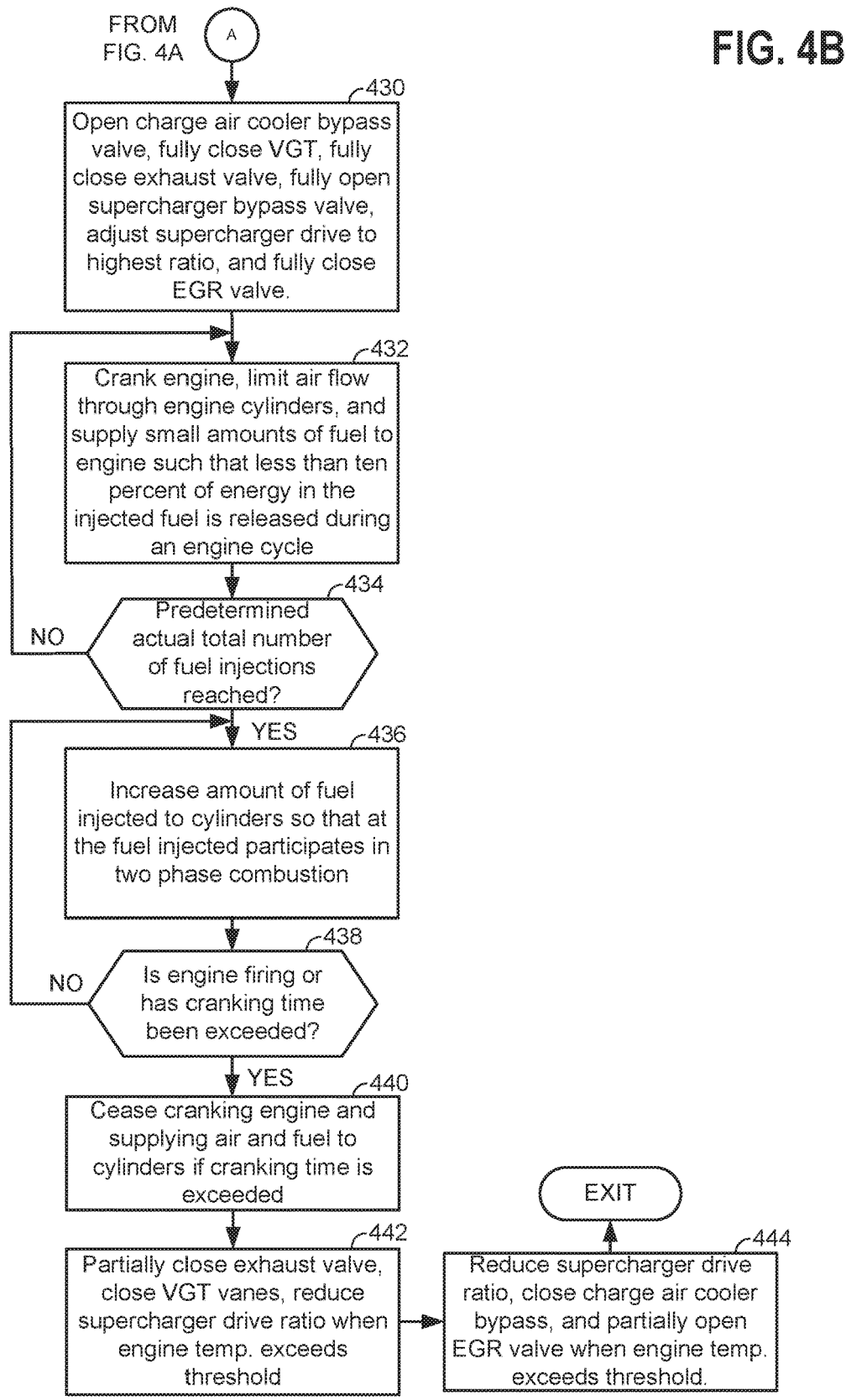

The present description is related to starting a diesel engine. FIG. 1 shows one example of a boosted diesel engine that does not include glow plugs. FIGS. 2 and 3 show two different engine starting sequences for cold starting the engine. FIGS. 4A-4B show a method for starting the engine shown in FIG. 1.

Referring to FIG. 1, opposed piston internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes cylinder 30 and cylinder walls 32 with intake piston 36a and exhaust piston 36b positioned therein and connected to crankshafts 40a and 40b respectively. Crankshafts 40a and 40b may be coupled together via belts, chains or gears. Crankshafts 40a and 40b may be rotated by electric machine 77 (e.g., a starter motor) to crank engine 10. Cylinder 30 is shown communicating with intake manifold 44 and exhaust manifold 48 via intake ports 44a and 44b and exhaust ports 48a and 48b.

Fuel injectors 68 and 69 are shown positioned in cylinder walls 32 and they may inject fuel directly into cylinder 30, which is known to those skilled in the art as direct injection. Fuel is delivered to fuel injectors 68 and 69 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Supercharger compressor 162 is mechanically driven and it draws air from downstream of turbocharger compressor 135. Turbocharger compressor 135 draws air from air intake 42. Supercharger compressor 162 supplies air to boost chamber 46. Exhaust gases spin turbocharger variable geometry turbine 137 which is coupled to turbocharger compressor 135 via shaft 136. Supercharger compressor 162 is mechanically driven via crankshaft 40b via shaft 161 and gear box 163, which may be coupled to crankshaft 40b via mechanism 164 (e.g., gears, a chain, or a belt). Supercharger gear box 163 includes a plurality of gear ratios for changing speed of supercharger compressor 162 relative to speed of crankshaft 40b. Supercharger compressor speed may be adjusted via selecting and engaging gears 163a of gear box 163. In one example, a given engine crankshaft speed may rotate supercharger compressor 162 at a first speed and a second speed via switching between a first gear ratio and a second gear ratio in gear box 163.

Supercharger compressor bypass valve 158 may be selectively opened to reduce air pressure in boost chamber 46 and return air and exhaust gas recirculation (EGR) to upstream of supercharger compressor 162. In some examples, a charge air cooler 156 may be provided downstream of supercharger compressor 162 to cool the air charge entering cylinder 30. Air charge cooler bypass valve 157 may be selectively opened to bypass charge air cooler 156. A positon of vane actuator 137a may be adjusted via controller 12 to increase or decrease rotational speed of turbine 137. In alternative examples, a waste gate 137b may replace or be used in addition to vane actuator 137a. Vane actuator 137a adjusts a position of variable geometry turbine vanes. Exhaust gases can pass through turbine 137 supplying little energy to rotate turbine 137 when vanes are in an open position. Exhaust gases can pass through turbine 137 and impart increased force on turbine 137 when vanes are in a closed position. Alternatively, wastegate 137b or a bypass valve allows exhaust gases to flow around turbine 137 so as to reduce the amount of energy supplied to the turbine.

In an alternative example, supercharger compressor 162 may be positioned upstream of turbocharger compressor 135. Further, an air charge cooler (not shown) may be positioned downstream of where EGR passage 82 joins intake 43 between supercharger compressor 162 and turbocharger compressor 135. The air charge cooler would obviate the need for an EGR cooler.

Exhaust gases may be recirculated to cylinder 30 via EGR system 81. EGR system includes optional EGR cooler 85, EGR valve 80, EGR passage 82, EGR cooler bypass 84, and cooled EGR passage 83. Exhaust gases may flow from exhaust manifold 48 to the engine air intake 43 between supercharger compressor 162 and turbocharger compressor 135. EGR may flow to the engine air intake when pressure in exhaust manifold 48 is greater than pressure between turbocharger compressor 135 and supercharger compressor 162. EGR may flow through EGR cooler 85 to reduce engine exhaust gas temperatures. EGR may bypass EGR cooler 85 when engine exhaust temperatures are low.

Fuel may be injected to cylinder 30 when pistons 36a and 36b are approaching each other after intake piston 36a covers intake ports 44a and 44b and exhaust piston 36b covers exhaust ports 48a and 48b. The fuel may then be combusted with air in cylinder 30 when piston 36 is near top-dead-center compression stroke. The fuel and air ignite via compression ignition. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Engine 10 does not include glow plugs or spark plugs since it is a compression ignition engine and since it does not include a cylinder head. Further, engine 10 does not include poppet valves to regulate air and exhaust flow into and out of cylinder 30.

Exhaust valve 140 is shown positioned in exhaust passage 49 downstream of turbine 137a and upstream of emissions device 70. Alternatively, exhaust valve 140 may be positioned downstream of emissions device 70. Exhaust valve 140 may be opened and closed to control pressure in exhaust manifold 48. Closing exhaust valve 140 restricts flow through exhaust valve 140 and may increase pressure in exhaust manifold 48. Opening exhaust valve 140 may improve flow through exhaust valve 140 and reduce pressure in exhaust manifold 48.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF). Upstream temperature sensor 79 and downstream temperature sensor 81 provide exhaust gas temperature measurements for determining the change in exhaust gas temperature across emissions device 70.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40b position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a two stroke cycle: the cycle includes a first stroke where the intake piston 36a travels toward exhaust piston 36b and exhaust piston 36b travels toward intake piston 36a. In the second stroke, intake piston 36a travels away from exhaust piston 36b and exhaust piston 36b travels away from intake piston 36a. Intake piston 36a controls flow through intake ports 44a and 44b. Exhaust piston 36b controls flow through exhaust ports 48a and 48b. In this example, exhaust piston 36b leads intake piston 36a by reaching a top dead center position (e.g., a maximum distance exhaust piston 36b is from crankshaft 40b) a few crankshaft degrees (e.g., depending on configuration, the difference may range between 0 and 20 crankshaft degrees) before intake piston 36 a reaches its top dead center position (e.g., maximum distance intake piston 36a is from crankshaft 40a). Thus, exhaust piston motion is offset from intake piston motion by a few crankshaft degrees.

During the first stroke, generally, the intake piston 36a and exhaust piston 36b are moving toward each other to compress air that has entered cylinder 30. The stroke begins at bottom dead center (BDC) for intake piston 36a (intake piston 36a is closest distance to crankshaft 40a) and it ends at top dead center for intake piston 36a (intake piston 36a is at its farthest distance from crankshaft 40a). As previously mentioned, exhaust piston 36b leads intake piston 36a by a few degrees so that it is already traveling toward its TDC position when intake piston is at BDC. Further, exhaust piston 36b reaches its TDC position just before intake piston 36a reaches its TDC position. Exhaust piston 36b is located just after its TDC position when intake piston 36a reaches its TDC position. Cylinder volume is smallest when intake piston 36a and exhaust piston 36b are near their respective TDC positions. Air and fuel are compressed in cylinder 30 as intake piston 36a and exhaust piston 36b advance toward their respective TDC positions. Intake ports 44a and 44b are open and pressurized air flows into cylinder 30 when intake pistons 36a and exhaust piston 36b are near their respective BDC positions. Exhaust ports 48a and 48b are also open when intake piston 36a and exhaust piston 36b are near BDC. Supercharger compressor 162 and turbocharger compressor 135 provide pressurized air to intake manifold 44 which may flow into cylinder 30 when intake ports 44a and 44b are open. As intake piston 36a and exhaust piston 36b move toward their respective TDC positions, exhaust ports 48a and 48b close. The crankshaft continues to rotate and after a predetermined actual total number of crankshaft degrees, intake ports 44a and 44b are closed to prevent additional air from entering cylinder 36. Thus, the exhaust ports are opened before the intake ports and the exhaust ports remain open for nearly the entire duration that the intake ports are open. Fuel is injected to cylinder 30 after exhaust ports 44a and 44b close, then the fuel and air mixture is ignited when intake piston 36a and exhaust piston 36b are near their respective TDC locations. The fuel and air mixture is ignited by compression ignition and not via a spark plug or energy from a glow plug. Fuel may be injected to cylinder 30 via a plurality of injections including pilot injections, main injections, and post injections.

During the second stroke, generally, the intake piston 36a and exhaust piston 36b are moving apart from each other after combustion takes place in cylinder 30. The second stroke begins at TDC of intake piston 36a and it ends at BDC of intake piston 36a. Intake piston 36a and exhaust piston 36b approach their respective BDC positions near where volume of cylinder 30 is greatest. Gases expanding in cylinder 30 push intake piston 36a and exhaust piston 36b apart toward their respective BDC positions. Exhaust piston 36b passes exhaust ports 48a and 48b as it travels toward its BDC. Exhaust ports 48a and 48b are uncovered when top of exhaust piston 36d passes exhaust ports 48a and 48b while exhaust piston 36b is traveling toward crankshaft 40b. Exhaust gases exit cylinder 30 after exhaust piston 36b passes exhaust ports 48a and 48b while traveling toward bottom dead center. Intake pistons 36a and exhaust piston 36b travel further toward their respective bottom dead center positions, and after a predetermined actual total number of crankshaft degrees, intake piston 36a uncovers intake ports 44a and 44b. Intake ports 44a and 44b are uncovered when top of intake piston 36c passes intake ports 44a and 44b while intake piston 36a is traveling toward crankshaft 40a. Fresh air enters cylinder 30 via intake ports 44a and 44b when intake ports 44a and 44b are uncovered. Intake piston 36a and exhaust piston 36b continue to travel toward their respective BDC locations. After intake piston reaches BDC the cylinder cycle repeats.

Thus, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

The system of FIG. 1 provides for an engine system, comprising: an opposed piston diesel engine including fuel injectors and not including glow plugs; a supercharger coupled to the opposed piston diesel engine, the supercharger having multiple drive ratios; a turbocharger coupled to the opposed piston diesel engine; and a controller including executable instructions stored in non-transitory memory to adjust the supercharger to a highest drive ratio, crank the opposed piston diesel engine, and open a charge air cooler in response to a request to start the opposed piston diesel engine. The engine system further comprising additional instructions to inject fuel to the engine during cranking, where injecting fuel during engine cranking includes injecting an amount of fuel into engine cylinders during an engine cycle that provides for only single phase combustion of two phase diesel fuel combustion during the engine cycle. The engine system further comprising additional instructions to increase an amount of fuel injected to the engine after the engine cycle completes while cranking the engine. The engine system further comprises additional instructions to adjust the supercharger having multiple drive ratios to drive ratio lower than the highest drive ratio in response to engine temperature exceeding a threshold. The engine system further comprises additional instructions to fully open vanes of the turbocharger in response to the request to start the opposed piston engine. The engine system further comprises additional instructions to fully open an exhaust gas recirculation valve in response to the request to start the opposed piston diesel engine.

Referring now to FIG. 2, a first example engine starting sequence according to method 400 is shown. The engine starting sequence of FIG. 2 may be for the engine and system shown in FIG. 1. The vertical lines at times T1-T5 represent times of interest in the sequence. The plots are aligned in time and occur at the same time. In this example engine starting sequence, work is performed on air within the engine via a supercharger compressor and engine compression. The air within the engine may be recirculated from the supercharger compressor outlet to the supercharger compressor inlet after the air passes through an engine cylinder via an EGR passage so that additional work may be performed on the air via the supercharger compressor. As a result, air temperature in the engine may be increased to facilitate and enable compression ignition within engine cylinders.

The first plot from the top of FIG. 2 is a plot of engine intake manifold pressure versus time. Trace 201 represents engine intake manifold pressure. The vertical axis represents engine intake manifold pressure and engine intake manifold pressure increases in the direction of the vertical axis arrow. The horizontal axis represents time and time increases from the left side of the figure to the right side of the figure.

The second plot from the top of FIG. 2 is a plot of engine exhaust manifold pressure versus time. Trace 202 represents engine exhaust manifold pressure. The vertical axis represents engine exhaust manifold pressure and engine exhaust manifold pressure increases in the direction of the vertical axis arrow. The horizontal axis represents time and time increases from the left side of the figure to the right side of the figure.

The third plot from the top of FIG. 2 is a plot of engine temperature (e.g., engine coolant temperature) versus time. Trace 203 represents engine temperature. The vertical axis represents engine temperature and engine temperature increases in the direction of the vertical axis arrow. The horizontal axis represents time and time increases from the left side of the figure to the right side of the figure. Line 250 represents a threshold temperature below which the presently illustrated engine starting procedure is applied to cold start the engine.

The fourth plot from the top of FIG. 2 is a plot of engine air charge cooler bypass valve state versus time. Trace 204 represents engine air charge cooler bypass valve state. The vertical axis represents engine air charge cooler bypass valve state and the engine air charge cooler bypass valve is open when trace 204 is at a higher level near the vertical axis arrow. The engine air charge cooler bypass valve is closed when trace 204 is at a lower level near the horizontal axis. The engine air charge cooler is bypassed when the engine charge air cooler valve is open. The horizontal axis represents time and time increases from the left side of the figure to the right side of the figure.

The fifth plot from the top of FIG. 2 is a plot of variable geometry turbocharger (VGT) vane position versus time. Trace 205 represents VGT vane position and VGT vanes are fully open when trace 205 is near the vertical axis arrow. VGT vanes are fully closed when trace 205 is near the horizontal axis. Exhaust gases exert more force on VGT vanes when VGT vanes are open so that the turbocharger compressor may rotate at a higher speed. The horizontal axis represents time and time increases from the left side of the figure to the right side of the figure.

The sixth plot from the top of FIG. 2 is a plot of exhaust valve position (e.g., 140 of FIG. 1) versus time. The vertical axis represents exhaust valve position. Trace 206 represents exhaust valve position and the exhaust valve is fully open when trace 206 is near the vertical axis arrow. The exhaust valve is fully closed when trace 206 is near the horizontal axis. The horizontal axis represents time and time increases from the left side of the figure to the right side of the figure.

The seventh plot from the top of FIG. 2 is a plot of amount of fuel injected to the engine versus time. Trace 207 represents amount of fuel injected to the engine. The vertical axis represents amount of fuel injected to the engine and the amount of fuel injected to the engine increases in the direction of the vertical axis arrow. The horizontal axis represents time and time increases from the left side of the figure to the right side of the figure.

The eighth plot from the top of FIG. 2 is a plot of supercharger bypass valve position (e.g., 158 of FIG. 1) versus time. The vertical axis represents supercharger bypass valve position. Trace 208 represents supercharger bypass valve position and the supercharger valve is fully open when trace 208 is near the vertical axis arrow. The supercharger bypass valve is fully closed when trace 208 is near the horizontal axis. The horizontal axis represents time and time increases from the left side of the figure to the right side of the figure.

The ninth plot from the top of FIG. 2 is a plot of supercharger drive ratio versus time. The vertical axis represents supercharger drive ratio. Trace 209 represents supercharger drive ratio. The second supercharger drive ratio is a higher drive ratio than the first supercharger drive ratio and the supercharger compressor rotates at a higher speed relative to engine crankshaft speed when the second supercharger drive ratio is engaged. The supercharger compressor rotates at a lower speed relative to engine crankshaft speed when the first supercharger drive ratio is engaged. Thus, by engaging the second supercharger drive ratio, the supercharger compressor rotates at a higher speed than if the first supercharger drive ratio were engaged. The horizontal axis represents time and time increases from the left side of the figure to the right side of the figure.

The tenth plot from the top of FIG. 2 is a plot of engine operating state versus time. The vertical axis represents engine operating state and the engine operating states of off (no engine rotation), cranking (engine is rotated via an electric machine), and on (engine is rotating under its own torque output). Trace 210 represents engine operating state. The horizontal axis represents time and time increases from the left side of the figure to the right side of the figure.

The eleventh plot from the top of FIG. 2 is a plot of EGR valve position versus time. The vertical axis represents EGR valve position. Trace 211 represents EGR valve position and the EGR valve is fully open when the EGR trace 211 is near the vertical axis arrow. The EGR valve is fully closed when EGR trace 211 is near the horizontal axis. The horizontal axis represents time and time increases from the left side of the figure to the right side of the figure.

At time T0, the engine is operating and combusting air and fuel. Intake manifold pressure is at a higher level and exhaust manifold pressure is at a middle level. The engine is operating at a warm temperature and the air charge cooler bypass valve is closed so that air entering engine cylinders is cooled. The VGT vanes are closed and the exhaust valve is fully open. The fuel injection amount is a lower level and the supercharger bypass valve is partially open. The supercharger drive ratio is at a lower ratio and the EGR valve is partially open.

At time T1, the engine is stopped. The engine may be stopped via a human driver or an autonomous driver. The intake manifold pressure and exhaust manifold pressure are reduced as the engine stops. The VGT vanes remain closed and the air charger cooler bypass valve remains closed. The exhaust valve remains open and no fuel is injected to the engine. The supercharger bypass valve is fully closed and the supercharger drive ratio remains at a first drive ratio. The EGR valve is fully closed.

Between time T1 and time T2, the intake manifold pressure and the exhaust manifold pressure decline. The engine temperature falls to less than threshold 250 and the exhaust valve is held fully open. Fuel is not injected to the engine and the supercharger bypass valve is closed. The EGR valve is also held closed.

At time T2, the engine is cranked in response to a request to start the engine (not shown). The supercharger drive ratio is engaged to the second ratio to increase work performed on air within the engine and its intake system. By engaging the second ratio, a greater amount of work may be performed on air in the engine intake system. The EGR valve is fully opened and the exhaust valve is fully closed so that air warmed by the supercharger compressor may be circulated through the engine where compression work may be added to further heat the air. The air is then returned to the supercharger compressor where additional work is performed on the air, thereby increasing air temperature further in preparation for combustion of a starting fuel charge injected to engine cylinders (e.g., a fuel charge that completes two phases of combustion). The VGT vanes are also fully opened so that the exhaust valve (e.g., 140 of FIG. 1)

controls exhaust manifold exhaust pressure. The supercharger bypass valve is closed so that air flows through the supercharger without recirculating directly back to the supercharger input without having to flow through the engine. The air charge cooler bypass valve is opened to reduce cooling of the air flowing through the engine.

Between time T2 and time T3, a small amount of fuel is injected to each engine cylinder. Alternatively, fuel injection may be deactivated. If fuel is injected, the amount of fuel injected is less than an amount that results in two phase combustion of the injected fuel during the engine cycle the fuel is injected. Diesel fuel is a fuel that exhibits two phases of combustion. During a first phase of combustion (e.g., a low temperature heat release phase), larger chain hydrocarbons are broken down into smaller chain hydrocarbons in an exothermic reaction. The first phase of combustion may be characterized by the presence of formation of formaldehydes and an absence of OH radicals and $CO_2$. The second stage of fuel combustion is identified by $CO_2$ formation and OH radical formation. Having fuel go through multiple compression events provides more time for the fuel to chemically react and reach the $2^{nd}$ stage of ignition. Both a small amount of fuel and a large amount of fuel will heat the combustion chamber if it goes through the $2^{nd}$ stage of ignition. However, a large amount of fuel is more likely to ignite too early on the $2^{nd}$ or $3^{rd}$ compression event. Furthermore, if ignition occurs very early with a small amount of fuel it would not cause the piston to slow significantly, but a large amount of fuel would not provide enough force to slow the crank speed if $2^{nd}$ stage ignition occurs very early in the compression stroke, but it may also lead to a change in rotation direction. However, by injecting a small amount of fuel, first phase combustion and heat release may be achieved even though second phase combustion is not achieved. The second phase of fuel combustion is prevented when a small amount of fuel is injected to a cylinder because the air-fuel mixture within the cylinder is too lean to support the second phase of combustion. Nevertheless, heat released during the first phase of combustion may further heat the air and remaining fuel mixture in preparation for an engine starting fuel charge (e.g., a first fuel charge delivered to an engine cylinder that participates in first instances of two phase combustion in the cylinder since the most recent engine cranking episode). The small fuel injection amounts that achieve only first phase combustion in an engine cylinder may be referred to as engine charge warming fuel charges or pre-starting fuel charges.

The intake manifold pressure is greater than the exhaust manifold pressure so that gases may be circulated from the supercharger compressor to engine cylinders, then to the EGR passage and back to the supercharger compressor inlet. The intake manifold pressure is increased via the supercharger compressor and the exhaust pressure is at a higher level since the exhaust valve is closed. The engine temperature remains below threshold 250 and the air charge cooler bypass valve remains open. The VGT vanes remain fully open and the supercharger bypass valve remains fully closed. The supercharger drive ratio remains at a high level and the EGR valve is fully open.

At time T3, the amount of fuel injected is increased to deliver the engine starting fuel charge. The time interval between time T2 and time T3 may be a function of engine temperature and an actual total number of engine charge warming fuel charges delivered to the engine since the most recent engine cranking began. The actual number of engine charge warming fuel charges may be indicative of a temperature rise within the engine. As such, the actual number of engine charge warming fuel charges may be useful to determine when the engine starting fuel charges may be delivered and expected to provide two phases of combustion and engine acceleration. The intake manifold pressure and the exhaust manifold pressures remain at their previous levels and the air charge cooler bypass remains open. The VGT vanes remain fully open and the exhaust valve is opened. The supercharger bypass valve remains closed and the supercharger drive ratio remains at the $2^{nd}$ level. The engine continues to be cranked and the EGR valve remains open.

At time T4, the last of the engine starting fuel charges is delivered (at least one engine starting fuel charge is provided to each engine cylinder) and the engine accelerates (not shown). The engine intake manifold pressure is increased as the engine accelerates and the exhaust pressure also rises. The exhaust valve remains open. The EGR valve is closed since recirculating heated charge via the supercharger compressor is no longer needed to start the engine. The engine transitions to run state and the VGT vanes are partially closed to activate the turbocharger compressor. The charge air cooler bypass valve remains open so charge air is not cooled and the amount of fuel injected is reduced to rotate the engine at idle speed. The supercharger bypass valve is also partially opened since engine boost pressure is sufficient. The supercharger drive ratio remains the $2^{nd}$ ratio.

Between time T4 and time T5, the engine temperature begins to increase and the remaining control parameters remain unchanged. At time T5, the engine temperature exceeds threshold 250 and the supercharger drive ratio is reduced in response to the engine temperature exceeding threshold 250. The air charge cooler bypass valve is also closed and the supercharger drive ratio is reduced in response to the engine temperature exceeding threshold 250. The EGR valve is also partially opened to provide external EGR to the engine.

In this way, gases in an engine (e.g., air) may be heated via work produced by a supercharger compressor. The gases may be recirculated through the supercharger compressor to provide additional heating to the gases, and small amounts of fuel may be injected to further heat gases being circulated in an engine during engine cranking. The engine may then accelerate under its own power after injecting engine starting fuel amounts to the engine cylinders. Thus, instead of heating air that enters an engine via a glow plug, a supercharger compressor and small fuel injection amounts may heat gases in the engine so that two stage combustion may be supported.

Referring now to FIG. 3, a second example engine starting sequence according to method 400 is shown. The engine starting sequence of FIG. 2 may be for the engine and system shown in FIG. 1. The vertical lines at times T10-T15 represent times of interest in the sequence. The plots are aligned in time and occur at the same time. In this example engine starting sequence, intake manifold pressure and exhaust manifold pressure are adjusted to a substantially same average pressure (e.g., within ±5% of each other) over an engine cycle during at least a portion of engine cranking. By maintain a substantially constant average pressure between the engine intake manifold and the engine exhaust manifold, it may be possible to perform work on gases in engine cylinders to thereby heat contents of the engine cylinders so that combustion may be initiated without glow plugs. Further, small amounts of fuel may be injected to the engine cylinders so that low temperature heat release from the fuel may further heat contents of engine cylinders and support combustion within engine cylinders.

The first plot from the top of FIG. 3 is a plot of engine intake manifold pressure versus time. Trace 301 represents engine intake manifold pressure. The vertical axis represents engine intake manifold pressure and engine intake manifold pressure increases in the direction of the vertical axis arrow. The horizontal axis represents time and time increases from the left side of the figure to the right side of the figure.

The second plot from the top of FIG. 3 is a plot of engine exhaust manifold pressure versus time. Trace 302 represents engine exhaust manifold pressure. The vertical axis represents engine exhaust manifold pressure and engine exhaust manifold pressure increases in the direction of the vertical axis arrow. The horizontal axis represents time and time increases from the left side of the figure to the right side of the figure.

The third plot from the top of FIG. 3 is a plot of engine temperature (e.g., engine coolant temperature) versus time. Trace 303 represents engine temperature. The vertical axis represents engine temperature and engine temperature increases in the direction of the vertical axis arrow. The horizontal axis represents time and time increases from the left side of the figure to the right side of the figure. Line 350 represents a threshold temperature below which the presently illustrated engine starting procedure is applied to cold start the engine.

The fourth plot from the top of FIG. 3 is a plot of engine air charge cooler bypass valve state versus time. Trace 304 represents engine air charge cooler bypass valve state. The vertical axis represents engine air charge cooler bypass valve state and the engine air charge cooler bypass valve is open when trace 304 is at a higher level near the vertical axis arrow. The engine air charge cooler bypass valve is closed when trace 304 is at a lower level near the horizontal axis. The engine air charge cooler is bypassed when the engine charge air cooler valve is open. The horizontal axis represents time and time increases from the left side of the figure to the right side of the figure.

The fifth plot from the top of FIG. 3 is a plot of variable geometry turbocharger (VGT) vane position versus time. Trace 305 represents VGT vane position and VGT vanes are fully open when trace 305 is near the vertical axis arrow. VGT vanes are fully closed when trace 305 is near the horizontal axis. Exhaust gases exert more force on VGT vanes when VGT vanes are open so that the turbocharger compressor may rotate at a higher speed. The horizontal axis represents time and time increases from the left side of the figure to the right side of the figure.

The sixth plot from the top of FIG. 3 is a plot of exhaust valve position (e.g., 140 of FIG. 1) versus time. The vertical axis represents exhaust valve position. Trace 306 represents exhaust valve position and the exhaust valve is fully open when trace 306 is near the vertical axis arrow. The exhaust valve is fully closed when trace 306 is near the horizontal axis. The horizontal axis represents time and time increases from the left side of the figure to the right side of the figure.

The seventh plot from the top of FIG. 3 is a plot of amount of fuel injected to the engine versus time. Trace 307 represents amount of fuel injected to the engine. The vertical axis represents amount of fuel injected to the engine and the amount of fuel injected to the engine increases in the direction of the vertical axis arrow. The horizontal axis represents time and time increases from the left side of the figure to the right side of the figure.

The eighth plot from the top of FIG. 3 is a plot of supercharger bypass valve position (e.g., 158 of FIG. 1) versus time. The vertical axis represents supercharger bypass valve position. Trace 308 represents supercharger bypass valve position and the supercharger valve is fully open when trace 308 is near the vertical axis arrow. The supercharger bypass valve is fully closed when trace 308 is near the horizontal axis. The horizontal axis represents time and time increases from the left side of the figure to the right side of the figure.

The ninth plot from the top of FIG. 3 is a plot of supercharger drive ratio versus time. The vertical axis represents supercharger drive ratio. Trace 309 represents supercharger drive ratio. The second supercharger drive ratio is a higher drive ratio than the first supercharger drive ratio and the supercharger compressor rotates at a higher speed relative to engine crankshaft speed when the second supercharger drive ratio is engaged. The supercharger compressor rotates at a lower speed relative to engine crankshaft speed when the first supercharger drive ratio is engaged. Thus, by engaging the second supercharger drive ratio, the supercharger compressor rotates at a higher speed than if the first supercharger drive ratio were engaged. The horizontal axis represents time and time increases from the left side of the figure to the right side of the figure.

The tenth plot from the top of FIG. 3 is a plot of engine operating state versus time. The vertical axis represents engine operating state and the engine operating states of off (no engine rotation), cranking (engine is rotated via an electric machine), and on (engine is rotating under its own torque output). Trace 310 represents engine operating state. The horizontal axis represents time and time increases from the left side of the figure to the right side of the figure.

The eleventh plot from the top of FIG. 3 is a plot of EGR valve position versus time. The vertical axis represents EGR valve position. Trace 311 represents EGR valve position and the EGR valve is fully open when the EGR trace 311 is near the vertical axis arrow. The EGR valve is fully closed when EGR trace 311 is near the horizontal axis. The horizontal axis represents time and time increases from the left side of the figure to the right side of the figure.

At time T10, the engine is operating and combusting air and fuel. Intake manifold pressure is at a higher level and exhaust manifold pressure is at a middle level. The engine is operating at a warm temperature and the air charge cooler bypass valve is partially open so that air entering engine cylinders is partially cooled. The VGT vanes are closed and the exhaust valve is fully open. The fuel injection amount is a lower level and the supercharger bypass valve is partially open. The supercharger drive ratio is at a lower ratio and the EGR valve is partially open.

At time T11, the engine is stopped. The engine may be stopped via a human driver or an autonomous driver. The intake manifold pressure and exhaust manifold pressure are reduced as the engine stops. The VGT vanes remain closed and the air charger cooler bypass valve is closed. The exhaust valve remains open and no fuel is injected to the engine. The supercharger bypass valve is fully closed and the supercharger drive ratio remains at a first drive ratio. The EGR valve is fully closed.

Between time T11 and time T12, the intake manifold pressure and the exhaust manifold pressure decline. The engine temperature falls to less than threshold 350 and the exhaust valve is held fully open. Fuel is not injected to the engine and the supercharger bypass valve is closed. The EGR valve is also held closed.

At time T12, the engine is cranked in response to a request to start the engine (not shown). The supercharger drive ratio is engaged to the second ratio to increase work performed on air within the engine and its intake system. By engaging the second ratio, a greater amount of work may be performed on air in the engine intake system. The EGR valve is fully closed and the exhaust valve is fully closed. The supercharger bypass valve is fully opened so that most air pumped by the supercharger compressor is returned to the supercharger compressor inlet. By closing the exhaust valve and opening the supercharger compressor valve, intake manifold pressure and exhaust manifold pressure may be maintained substantially the same. The air in engine cylinders may be held in engine cylinders and heated via compression work provided by the engine as the engine is cranked. The VGT vanes are also fully closed. The air charge cooler bypass valve is opened to reduce cooling of the air flowing through the engine.

Between time T12 and time T13, a small amount of fuel is injected to each engine cylinder. Alternatively, fuel injection may be deactivated. If fuel is injected, the amount of fuel injected is less than an amount that results in two phase combustion of the injected fuel during the engine cycle the fuel is injected. By injecting a small amount of fuel, first phase combustion and heat release may be achieved even though second phase combustion is not achieved. The second phase of fuel combustion is prevented when a small amount of fuel is injected to a cylinder because the air-fuel mixture within the cylinder is too lean to support the second phase of combustion. Nevertheless, heat released during the first phase of combustion may further heat the air and remaining fuel mixture in preparation for an engine starting fuel charge (e.g., a first fuel charge delivered to an engine cylinder that participates in first instances of two phase combustion in the cylinder since the most recent engine cranking episode). The small fuel injection amounts that achieve only first phase combustion in an engine cylinder may be referred to as engine charge warming fuel charges or pre-starting fuel charges.

The engine temperature remains below threshold 350 and the air charge cooler bypass valve remains open. The VGT vanes remain fully closed and the supercharger bypass valve remains fully open. The supercharger drive ratio remains at a high level and the EGR valve is fully open.

At time T13, the amount of fuel injected is increased to deliver the engine starting fuel charge. The time interval between time T12 and time T13 may be a function of engine temperature and an actual total number of engine charge warming fuel charges delivered to the engine since the most recent engine cranking began. The actual number of engine charge warming fuel charges may be indicative of a temperature rise within the engine. As such, the actual number of engine charge warming fuel charges may be useful to determine when the engine starting fuel charges may be delivered and expected to provide two phases of combustion and engine acceleration. The intake manifold pressure and the exhaust manifold pressures remain at their previous levels and the air charge cooler bypass valve remains open. The VGT vanes remain fully closed and the exhaust valve opens. The supercharger bypass valve partially closes to provide air to engine cylinders. The supercharger drive ratio remains at the $2^{nd}$ level. The engine continues to be cranked and the EGR valve remains closed.

At time T14, the last of the engine starting fuel charges is delivered (at least one engine starting fuel charge is provided to each engine cylinder) and the engine accelerates (not shown). The engine intake manifold pressure is increased as the engine accelerates and the exhaust pressure also rises, but the exhaust pressure rise is limited by the exhaust valve being partially open. The EGR valve is closed and the engine transitions to run state. The VGT vanes remain closed to activate the turbocharger compressor. The charge air cooler bypass valve remains open so charge air is not cooled and the amount of fuel injected is reduced to rotate the engine at idle speed. The supercharger bypass valve is also partially opened since engine boost pressure is sufficient. The supercharger drive ratio remains the $2^{nd}$ ratio.

Between time T14 and time T15, the engine temperature begins to increase and the remaining control parameters remain unchanged. At time T15, the engine temperature exceeds threshold 350 and the supercharger drive ratio is reduced in response to the engine temperature exceeding threshold 350. The air charge cooler bypass valve is also closed and the supercharger drive ratio is reduced in response to the engine temperature exceeding threshold 350. The EGR valve is also partially opened to provide external EGR to the engine.

In this way, gases in an engine (e.g., air) may be heated via work produced by engine compression. The gases may be compressed several times to facilitate combustion in the cylinders. Further, small amounts of fuel may be injected to further heat gases in the cylinders during engine cranking. The engine may then accelerate under its own power after injecting engine starting fuel amounts to the engine cylinders. Thus, instead of heating air that enters an engine via a glow plug, engine compression heating may be used to heat cylinder contents.

Referring now to FIGS. 4A-4B, a method for adjusting fuel injection timing is shown. The method of FIGS. 4A-4B may be stored as executable instructions in non-transitory memory in systems such as shown in FIG. 1. A flowchart of a method for starting a diesel engine that does not include glow plugs is shown. The method of FIGS. 4A-4B may be incorporated into and may cooperate with the systems of FIG. 1. Further, at least portions of the method of FIGS. 4A-4B may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 402, method 400 judges if engine operation (e.g., rotation and combustion) is desired. In one example, method 400 judges that engine operation is desired if a human or autonomous driver supplies input to a controller that indicates a desire for engine operation (e.g., inserting a key in a switch or depressing a pushbutton). If method 400 judges that engine operation is desired, the answer is yes and method 400 proceeds to 404. Otherwise, the answer is no and method 400 proceeds to 422.

At 422, method 400 ceases injecting fuel to the engine if the engine is operating. In addition, method 400 may adjust selected actuators to predetermined states to reduce engine starting time if the engine is operating. For example, method 400 may adjust an air charge cooler bypass valve to an open state, VGT vanes fully open, an exhaust valve closed, a supercharger to a second drive ratio and an EGR valve open if operating conditions indicate an engine start as shown in FIG. 2 is desired. Similarly, method 400 may adjust an air charge cooler bypass valve to an open state, VGT vanes fully closed, an exhaust valve closed, a supercharger to a second drive ratio, a supercharger bypass valve to open, and an EGR valve closed if operating conditions indicate an engine start as shown in FIG. 3 is desired. In one example, the engine starting sequence shown in FIG. 2 is desired for starting an engine when engine temperature is in a first temperature range, and the engine starting sequence shown in FIG. 3 is desired for starting the engine when engine temperature is in a second temperature range. The engine starting temperature may be estimated from ambient temperature and an amount if time the engine is expected to not be operating. Alternatively, engine actuators may be preposition to predetermined states irrespective of expected engine starting temperature. Method 400 proceeds to exit after prepositioning engine actuators.

At 404, method 400 judges if the engine is operating. Method 400 may judge that the engine is operating if engine speed is greater than a threshold speed (e.g., 300 RPM). If method 400 judges that the engine is operating, the answer is yes and method 400 proceeds to 420. Otherwise, the answer is no and method 400 proceeds to 406.

At 420, method 400 adjusts engine actuators responsive to vehicle operating conditions. For example, engine throttle position, EGR valve position, supercharger drive ratio, and fuel injection timing in response to driver demand torque and engine speed. Method 400 proceeds to exit.

At 406, method 400 judges if a first starting mode is selected. In one example, the first starting mode may be selected responsive to engine temperature. If engine temperature is within a first predetermined range (e.g., less than 20° C.), the answer is yes and method 400 proceeds to 408. Otherwise, the answer is no and method 400 proceeds to 430 to start the engine via a second engine starting method.

At 408, method 400 fully opens a charge air cooler bypass valve, fully opens VGT vanes, fully closes an exhaust valve, fully closes a supercharger bypass valve, fully opens an EGR valve, and adjusts a supercharger drive ratio to a second drive ratio (e.g., a high drive ratio) in response to a request to start an engine. The supercharger drive ratio is engaged in the second drive ratio to increase supercharger compressor output, which may increase charge heating within the engine system. The air charge cooler is bypassed and the supercharger is not bypassed to increase heating of charge in the engine. This sequence is shown in FIG. 2. Method 400 proceeds to 410.

At 410, method 400 cranks the engine (e.g., rotates the engine via an electric machine) and pressurized air from the supercharger compressor flows to engine cylinders. Further, method 400 begins to inject small amounts of fuel (e.g., fuel amounts less than a threshold amount that provides for two phase combustion of fuel). The small fuel amounts are compressed as the engine rotates and the small fuel amounts provide low temperature heat release to gases in the engine. The small fuel amounts only support a first phase of combustion if the injected fuel as discussed in regard to the fuel injection of FIG. 2. The small fuel injection amounts are insufficient to support two phase combustion of the injected fuel. The small fuel injection amounts are engine charge warming fuel charges or pre-starting fuel charges. Fuel that does not combust in the first phase of combustion may be combusted when engine starting fuel charges are injected. A predetermined number of engine charge warming fuel charges may be injected while the engine is being cranked. The predetermined number of engine charge warming fuel charges or injections may be empirically determined and they may be a function of engine temperature. The fuel may be injected as the pistons approach top dead center.

After the predetermined actual total number of engine charge warming fuel injections has been injected or after a predetermined amount of time has expired since the most recent engine cranking began, method 400 injects engine starting fuel charges or injections to the engine cylinders. The engine starting fuel charges may be empirically determined and a function of engine temperature and engine intake manifold pressure. The engine starting fuel charges combust injected fuel in two phases of combustion as discussed in the description of FIG. 2 and the engine may accelerate as a result of the combustion. The mass of engine starting fuel injections is greater than the mass of engine charge warming fuel injections. In addition, the exhaust valve is fully opened to let combustion gas pass from the exhaust system. Method 400 proceeds to 412.

At 412, method 400 judges if the engine is firing or if a predetermined engine cranking time has expired since the most recent engine cranking began. Method 400 may determine that the engine is firing if engine speed exceeds a threshold speed (e.g., 300 RPM). If the engine is not firing or if the engine cranking time has not expired, the answer is no and method 400 returns to 412 and fuel injection to the engine continues. If the engine is firing (e.g., combusting air and fuel) or if the engine cranking time has been exceeded, the answer is yes and method 400 proceeds to 414.

At 414, method 400 ceases cranking the engine and supplying air and fuel to engine cylinders if the engine has not fired and the threshold engine cranking time has been exceeded. If the engine is firing, method 400 proceeds to 416 without making adjustments to engine fuel and air supplied to the engine.

At 416, method 400 continues to hold the exhaust valve open, partially closes the VGT vanes to accelerate the turbocharger turbine, adjusts the amount of fuel delivered to engine cylinders responsive to the driver demand torque, and partially opens the supercharger bypass valve since operating the supercharger compressor in the second drive mode may provide excess air flow. FIG. 2 shows this phase of the engine starting sequence.

At 418, method 400 reduces the supercharger drive ratio, closes the charge air cooler bypass valve, and partially opens the EGR valve responsive to engine temperature exceeding a threshold temperature. In one example, the threshold temperature may be a warm engine temperature (e.g., 60° C.).

In this way, charge of an engine may be heated via engine compression work performed by cranking the engine, supercharger compressor work performed on air in the engine, and lower temperature heat release provided via only first phase combustion of injected fuel during an engine cycle as shown in FIG. 2.

At 430, method 400 opens the charge air cooler bypass valve, fully closes VGT vanes, fully closes the exhaust valve, fully opens the supercharger bypass valve, adjusts the supercharger drive ratio to a highest value (e.g., $2^{nd}$ ratio), and fully closes the EGR valve in response to an engine start request as shown in FIG. 3. The supercharger bypass valve is opened and the exhaust valve is closed to maintain substantially equal intake and exhaust manifold pressures during engine cranking as described in the discussion of FIG. 3. This allows the engine to compress and heat the charge in the engine cylinder a number of times. Method 400 proceeds to 432.

At 432, method 400 cranks the engine via an electric machine, limits air flow through engine cylinders, and injects small amount of fuel (e.g., engine charge warming fuel injections as discussed in the description of FIG. 3). The small amounts of fuel release heat to the charge in the engine cylinders, thereby heating contents of engine cylinders. The small amounts of fuel only participate in a first phase of combustion in a cylinder cycle. Fuel that is not combusted in the first phase of combustion may be combusted when engine starting fuel charges are injected to the engine cylinders. Method 400 proceeds to 434.

At 434, method 400 judges if a predetermined actual total number of engine charge warming fuel injections have been injected. By judging if a predetermined actual total number of engine charge warming fuel injections have been performed, charge heating and charge temperature may be estimated to be sufficient to support two phase fuel combustion in engine cylinders. Alternatively, method 400 may judge if the engine has been cranked for an amount of time exceeding a threshold (e.g., 20 seconds) since the most recent engine cranking began. If method 400 judges engine cranking time has exceeded a threshold or if the predetermined actual total number of engine charge warming fuel injections has been exceeded, the answer is yes and method 400 proceeds to 436. Otherwise, the answer is no and method 400 returns to 432.

At 436, method 400 increases the amount of fuel injected so that the injected fuel participates in two phase combustion during an engine cycle in which the fuel was injected. The injected fuel may be referred to as the engine starting fuel charge. The fuel amount may be empirically determined and a function of engine temperature and barometric pressure. The engine starting fuel is injected as shown in FIG. 3 at time T13. The injected fuel may be combusted and it may accelerate the engine. Further, method 400 opens the exhaust valve to release combustion byproducts from the engine's exhaust system. The engine continues to be cranked while the fuel is injected. Method 400 proceeds to 438.

At 438, method 400 judges if the engine is firing (e.g., combusting the air and fuel in two phase combustion) or if the engine has been cranked for an extended period of time and the engine cranking threshold (e.g., 30 seconds) has exceeded. If the engine cranking threshold has been exceed by cranking the engine for an extended period of time or if the engine is firing, the answer is yes and method 400 proceeds to 440. Otherwise, the answer is no and method 400 returns to 436.

At 440, method 400 ceases cranking the engine and supplying air and fuel to engine cylinders if the engine has not fired and the threshold engine cranking time has been exceeded. If the engine is firing, method 400 proceeds to 442 without making adjustments to engine fuel and air supplied to the engine.

At 442, method 400 partially closes VGT vanes to begin turbocharger compressor operation, continues to hold open the air charge cooler bypass valve, partially opens the supercharger bypass valve to reduce air pressure in the boost chamber, and continues to hold the EGR valve closed. Method 400 proceeds to 444.

At 444, method 400 closes the air charge cooler bypass valve, partially opens the EGR valve, and reduces the supercharger drive ratio in response to the engine reaching a threshold temperature (e.g., an engine temperature that indicates that the engine is warm, such as 60° C.). Method 400 then proceeds to exit.

Thus, the method of FIGS. 4A-4B provides for a diesel engine starting method, comprising: responsive to an engine start request, adjusting a supercharger having multiple drive ratios to a highest drive ratio, cranking an engine, and injecting fuel to the engine during cranking, where injecting fuel during engine cranking includes injecting an amount of fuel into engine cylinders during an engine cycle that provides for a greater percentage of the injected fuel participating in a first phase of two phase diesel fuel combustion than a percentage of the injected fuel participating in second phase of two phase diesel fuel combustion. The diesel engine starting method includes where the first phase of combustion is characterized by absence of CO formation and OH radical formation during the first phase of two phase combustion.

In some examples, the diesel engine starting method further comprises fully closing an exhaust valve, opening an air charge cooler bypass valve, and opening an EGR valve responsive to the engine start request. The diesel engine starting method includes where injecting fuel during cranking includes injecting fuel when two pistons of a cylinder are approaching top dead center. The diesel engine starting method further comprises increasing an amount of fuel injected to the engine after the engine cycle completes (e.g., during a subsequent engine cycle) while cranking the engine. The diesel engine starting method includes where increasing an amount of fuel injected to the engine after the engine cycle completes includes injecting a fuel amount sufficient produce two phase diesel fuel combustion during a subsequent engine cycle. The diesel engine starting method further comprises adjusting the supercharger having multiple drive ratios to drive ratio lower than the highest drive ratio in response to engine temperature exceeding a threshold.

The method of FIGS. 4A-4B also provide for a diesel engine starting method, comprising: responsive to an engine start request, adjusting a supercharger having multiple drive ratios to a highest drive ratio, cranking an engine, closing an exhaust valve positioned in an exhaust system downstream of a turbocharger turbine, and fully opening a supercharger bypass valve. The diesel engine starting method further comprises injecting fuel to the engine during cranking, where injecting fuel during engine cranking includes injecting an amount of fuel into engine cylinders during an engine cycle that provides for only single phase combustion of two phase diesel combustion during the engine cycle. The diesel engine starting method further comprises increasing an amount of fuel injected to the engine after the engine cycle completes while cranking the engine. The diesel engine starting method includes where increasing an amount of fuel injected to the engine after the engine cycle completes includes injecting a fuel amount sufficient to produce two phase diesel fuel combustion during a subsequent engine cycle. The diesel engine starting method further comprises providing a substantially equal average intake manifold pressure and average exhaust manifold pressure during engine cranking for at least one engine cycle. The diesel engine starting method includes where the at least one engine cycle is one engine revolution. The diesel engine starting method further comprises injecting fuel to the engine when a first piston of a cylinder and a second piston of the cylinder are approaching top dead center.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A diesel engine starting method, comprising:
responsive to an engine start request, adjusting a supercharger having multiple drive ratios to a highest drive ratio, cranking an engine, and injecting fuel to the engine during cranking, where injecting fuel during engine cranking includes injecting an amount of fuel into engine cylinders during an engine cycle that provides for a greater percentage of the injected fuel participating in a first phase of two phase diesel fuel combustion than a percentage of the injected fuel participating in a second phase of the two phase diesel fuel combustion.

2. The diesel engine starting method of claim 1, where the first phase of combustion is characterized by absence of CO formation and OH radical formation during the first phase of the two phase combustion.

3. The diesel engine starting method of claim 1, further comprising fully closing an exhaust valve, opening an air charge cooler bypass valve, and opening an EGR valve responsive to the engine start request.

4. The diesel engine starting method of claim 1, where injecting fuel during cranking includes injecting fuel when two pistons of a cylinder are approaching top dead center.

5. The diesel engine starting method of claim 1, further comprising increasing an amount of fuel injected to the engine during a subsequent engine cycle while cranking the engine.

6. The diesel engine starting method of claim 5, where increasing an amount of fuel injected to the engine after the engine cycle completes includes injecting a fuel amount sufficient produce two phase diesel fuel combustion during the subsequent engine cycle.

7. The diesel engine starting method of claim 1, further comprising adjusting the supercharger having multiple drive ratios to a drive ratio lower than the highest drive ratio in response to engine temperature exceeding a threshold.

8. A diesel engine starting method, comprising:
responsive to an engine start request, adjusting a supercharger having multiple drive ratios to a highest drive ratio, cranking an engine, closing an exhaust valve positioned in an exhaust system downstream of a turbocharger turbine, and fully opening a supercharger bypass valve; and
injecting fuel to the engine during cranking, where injecting fuel during engine cranking includes injecting an amount of fuel into engine cylinders during an engine cycle that provides for only single phase combustion of two phase diesel combustion during the engine cycle.

9. The diesel engine starting method of claim 8, further comprising increasing an amount of fuel injected to the engine during a subsequent engine cycle while cranking the engine.

10. The diesel engine starting method of claim 8, where increasing an amount of fuel injected to the engine after the engine cycle completes includes injecting a fuel amount sufficient to produce two phase diesel fuel combustion during a subsequent engine cycle.

11. The diesel engine starting method of claim 8, further comprising providing a substantially equal average intake manifold pressure and average exhaust manifold pressure during engine cranking for at least one engine cycle.

12. The diesel engine starting method of claim 11, where the at least one engine cycle is one engine revolution.

13. The diesel engine starting method of claim 8, further comprising injecting fuel to the engine when a first piston of a cylinder and a second piston of the cylinder are approaching top dead center.

14. An engine system, comprising:
an opposed piston diesel engine including fuel injectors and not including glow plugs;
a supercharger coupled to the opposed piston diesel engine, the supercharger having multiple drive ratios;
a turbocharger coupled to the opposed piston diesel engine; and
a controller including executable instructions stored in non-transitory memory to adjust the supercharger to a highest drive ratio, crank the opposed piston diesel engine, and open a charge air cooler in response to a request to start the opposed piston diesel engine, and additional instructions to inject fuel to the engine during cranking, where injecting fuel during engine cranking includes injecting an amount of fuel into engine cylinders during an engine cycle that provides for less than ten percent of energy in the injected fuel being released during the engine cycle.

15. The engine system of claim 14, further comprising additional instructions to increase an amount of fuel injected to the engine during a subsequent engine cycle while cranking the engine.

16. The engine system of claim 14, further comprising additional instructions to adjust the supercharger having multiple drive ratios to a drive ratio lower than the highest drive ratio in response to engine temperature exceeding a threshold.

17. The engine system of claim 14, further comprising additional instructions to fully open vanes of the turbocharger in response to the request to start the opposed piston engine.

18. The engine system of claim 14, further comprising additional instructions to fully open an exhaust gas recirculation valve in response to the request to start the opposed piston diesel engine.

* * * * *